United States Patent
Yang et al.

(10) Patent No.: US 11,742,742 B2
(45) Date of Patent: Aug. 29, 2023

(54) CONSTANT-CURRENT CONTROL DEVICE AND RELATED CONTROL METHOD

(71) Applicant: Ark Semiconductor Corp. Ltd., Shenzhen (CN)

(72) Inventors: Fong-Cheng Yang, Taipei (TW); Yi-Jung Tu, Taoyuan (TW)

(73) Assignee: Ark Semiconductor Corp. Ltd., Shenzhen (CN)

( * ) Notice: Subject to any disclaimer, the term of this patent is extended or adjusted under 35 U.S.C. 154(b) by 155 days.

(21) Appl. No.: 17/531,820

(22) Filed: Nov. 22, 2021

(65) Prior Publication Data
US 2022/0190707 A1    Jun. 16, 2022

(30) Foreign Application Priority Data
Dec. 11, 2020    (CN) .......................... 202011459699.X

(51) Int. Cl.
*H02M 3/335*    (2006.01)
*H02M 1/08*    (2006.01)

(52) U.S. Cl.
CPC ......... *H02M 1/08* (2013.01); *H02M 3/33507* (2013.01)

(58) Field of Classification Search
CPC .. H02M 1/08; H02M 3/33507; H02M 1/0025; H02M 1/32
See application file for complete search history.

(56) References Cited

U.S. PATENT DOCUMENTS

| | | | |
|---|---|---|---|
| 4,164,687 A * | 8/1979 | Ahmed | H04N 3/233 348/E3.044 |
| 8,880,178 B2 * | 11/2014 | Popovic | A61N 1/36003 607/148 |
| 10,084,386 B2 * | 9/2018 | Werner | H03K 17/14 |
| 2008/0007982 A1 | 1/2008 | Piper | |
| 2010/0033136 A1 * | 2/2010 | Yang | H02M 3/33507 320/140 |
| 2013/0021005 A1 | 1/2013 | Saint-Pierre | |
| 2013/0135905 A1 | 5/2013 | Yeh | |
| 2014/0009977 A1 | 1/2014 | Huang | |
| 2018/0246556 A1 | 8/2018 | Pasqua | |
| 2019/0280515 A1 | 9/2019 | Tian | |

FOREIGN PATENT DOCUMENTS

| | | |
|---|---|---|
| CN | 100545778 C | 9/2009 |
| TW | 200634466 | 10/2006 |
| TW | 200828755 | 7/2008 |
| TW | 201101666 A1 | 1/2011 |
| TW | 201404010 A | 1/2014 |

* cited by examiner

*Primary Examiner* — Kyle J Moody
(74) *Attorney, Agent, or Firm* — Winston Hsu

(57) ABSTRACT

A constant-current control device for a power supply including a primary side switch and a secondary winding includes a voltage waveform detector, configured to generate a discharging period signal within a time length when the secondary winding is discharging according to a first feedback voltage and a control voltage; and a constant-current controller, wherein an integrator of the constant-current controller is configured to receive one of a first current source and a second current source according to the discharging period signal and a current detecting voltage to generate an integrator result voltage, wherein the current detecting voltage is related to a secondary winding current value flowing through the secondary winding and the secondary winding current value is positively related to a secondary output current value of the power supply.

20 Claims, 11 Drawing Sheets

CONSTANT-CURRENT CONTROL DEVICE AND RELATED CONTROL METHOD

BACKGROUND OF THE INVENTION

1. Field of the Invention

The present invention relates to a constant-current control device and a related control method, and more particularly, to a constant-current control device and a related control method for a power supply.

2. Description of the Prior Art

A power supply is essential for conventional electronic devices, and is utilized for converting the power from a battery or an alternating current (AC) supply into power for the electronic devices. Most conventional power supplies apply a switch mode power supply (SMPS), which includes two control methods: the primary side control (PSC) and the secondary side control (SSC), wherein the primary side control SMPS is configured to detect a reflective voltage on an auxiliary winding to indirectly detect an output voltage on the secondary winding and an output voltage of an output terminal of the SMPS.

The conventional SMPS of the primary winding control may thereby dynamically adjust the output voltage according to the voltage of an interior integrated circuit (IC) so as to execute an overcurrent protection measurement. Alternatively, the conventional SMPS of the primary winding control may vary the output voltage based on a protection current outputted by the IC. The above methods lack flexibility of hardware, however, and are influenced by an inductance error of a transformer of the power supply.

In another method, the conventional SMPS of the primary winding control may adjust a peak value of a current detecting voltage of a current detecting terminal of the auxiliary winding to adjust the output current of the power supply. This method requires detecting a discharging time of the secondary winding of the SMPS, however, which requires high complexity of circuitry.

Therefore, improvements are necessary to the conventional techniques.

SUMMARY OF THE INVENTION

The present invention provides a constant-current control device and a related control method, which executes a two-stage constant-current control before an execution of an overcurrent protection mechanism of the power supply.

The present invention discloses a constant-current control device for a power supply, wherein the power supply includes a primary side switch and a secondary winding, the primary side switch is configured to receive a control voltage to be selectively conductive or open, the constant-current control device comprises a voltage waveform detector, configured to generate a discharging period signal based on a first feedback voltage and the control voltage, and the discharging period signal associated with a period of discharging time of the secondary winding; and a constant-current controller, coupled to the voltage waveform detector, including an integrator, a first current source and a second current source, wherein the integrator is configured to receive one of the first current source and the second current source to generate an integrator result voltage based on the discharging period signal and a current detecting voltage, the current detecting voltage is related to a secondary winding current value flowing through the secondary winding, and the secondary winding current value is positively related to a secondary winding output current value of the power supply; wherein when the integrator is configured to receive the first current source and a variation trend of the integrator result voltage is different from an integration trend of the first current source, and when the integrator result voltage reaches a second boundary voltage, the integrator is switched to receive the second current source; wherein when the integrator is configured to receive the second current source and the variation trend of the integrator result voltage is same as an integration trend of the second current source, and when the integrator result voltage reaches a first boundary voltage, the integrator is switched to receive the first current source.

The present invention further discloses a constant-current control method for a power supply, wherein the power supply comprises a voltage waveform detector, a constant-current controller, a primary side switch and a secondary winding, and the primary side switch is configured to receive a control voltage to be selectively conductive or open, the constant-current control device comprises generating a discharging period signal associated with a period of discharging time of the secondary winding according to a first feedback voltage and the control voltage; and receiving, by an integrator of the constant-current controller, one of the first current source and the second current source according to the discharging period signal and a current detecting voltage to generate an integrator result voltage, the current detecting voltage is related to a secondary winding current value flowing through the secondary winding, and the secondary winding current value is positively related to a secondary winding output current value of the power supply; wherein when the integrator is configured to receive the first current source and a variation trend of the integrator result voltage is different from an integration trend of the first current source, and when the integrator result voltage reaches a second boundary voltage, the integrator is configured to receive the second current source; wherein when the integrator is configured to receive the second current source and the variation trend of the integrator result voltage is same as an integration trend of the second current source, and when the integrator result voltage reaches a first boundary voltage, the integrator is configured to receive the first current source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
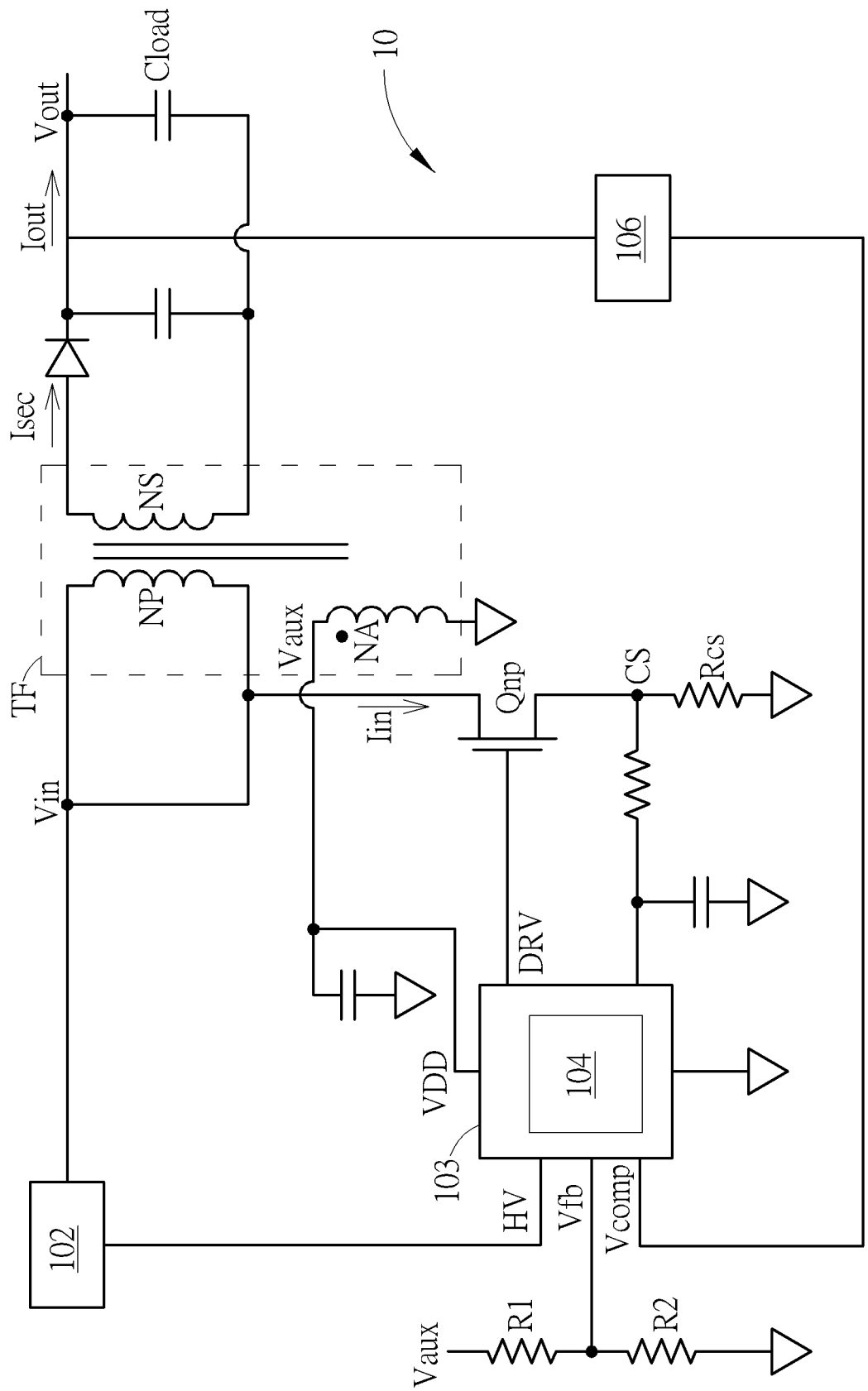
FIG. 1 is a schematic diagram of a power supply according to an embodiment of the present invention.

FIG. 1 is a schematic diagram of a power supply 10 according to an embodiment of the present invention. The power supply 10 includes a bridge circuit 102, a transformer TF and a pulse width modulation (PWM) controller 103. The PWM controller 103 includes a constant-current control device 104. The bridge circuit 102 is configured to transform an alternating current (AC) into a direct current Vin. The transformer TF includes a primary winding NP, a secondary winding NS and an auxiliary winding NA. Power source for operation of the PWM controller 103 may be provided by a voltage HV of the bridge circuit 102 or a voltage Vdd of the auxiliary winding NA. The PWM controller 103 is configured to control a primary side switch element Qnp via a control voltage DRV to turn on/off the power supply 10, wherein when the primary side switch element Qnp is turned on, the primary winding NP of the transformer TF stores the energy in an inductor of the transformer TF; when the primary side switch element Qnp is turned off, the inductor of the transformer TF releases the stored energy to an output capacitor Cload on the secondary side via a secondary winding current Isec to establish an output voltage Vout, which has a secondary winding output current value Iout, wherein the secondary winding current value Isec is positively related to the secondary winding output current value Iout of the power supply, i.e. when the secondary winding current value Isec is increased, the secondary winding output current value Iout is increased.

The power supply 10 further includes resistors R1, R2, configured to detect a voltage stress Vaux of an auxiliary voltage NA to provide a first feedback voltage Vfb to the PWM controller 103, wherein when the primary side switch element Qnp is off, the voltage stress Vaux is a reflective voltage of a voltage stress of the secondary winding NS. In addition, the power supply 10 may include an optical coupling feedback circuit 106, such that the PWM controller 103 may receive a second feedback signal Vcomp, which represents the output voltage Vout, and may isolate signals of, respectively, the primary winding and the secondary winding. In addition, the power supply 10 may reflect a current Iin flowing through the primary side switch element Qnp according to a current detecting voltage Vcs by detecting a current detecting resistor Rcs of a current detecting terminal CS.

Figure 2:
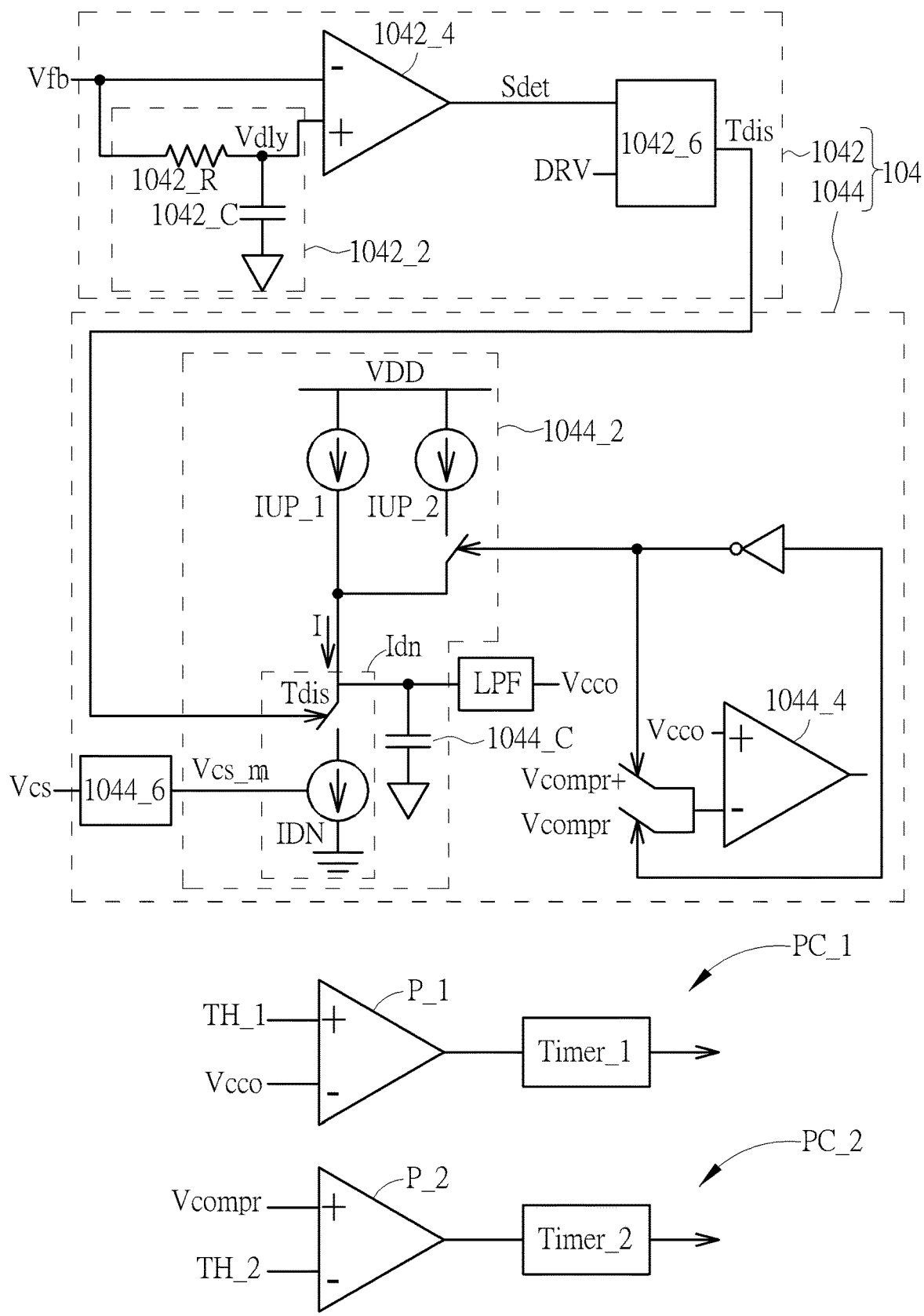
FIG. 2 is a schematic diagram of a constant-current control device according to an embodiment of the present invention.

Refer to FIG. 2, which is a schematic diagram of the constant-current control device 104 of the PWM controller 103 according to an embodiment of the present invention. The constant-current control device 104 includes a voltage waveform detector 1042 and a constant-current controller 1044. The voltage waveform detector 1042 is configured to generate a discharging period signal Tdis associated with a period of discharging time of the secondary winding NS according to the first feedback voltage Vfb and the control voltage DRV.

In detail, the voltage waveform detector 1042 includes a low-pass filter 1042_2, a comparator 1042_4 and a logic circuit 1042_6. The low-pass filter 1042_2 includes a resistor 1042_R and a capacitor 1042_C, configured to perform low-pass filtering for the first feedback voltage Vfb to generate a delay signal Vdly, i.e. the low-pass filter 1042_2 delays the first feedback voltage Vfb with a fixed time period, which is equivalent to a resistor-capacitor (RC) time constant. The comparator 1042_4 is configured to compare the first feedback voltage Vfb and the delay signal Vdly, so as to provide a detecting result signal Sdet to the logic circuit 1042_6 when the first feedback voltage Vfb is lower than the delay signal Vdly for a predetermined level. When the secondary winding NS of the power supply 10 is discharged completely, the logic circuit 1042_6 may generate the discharging period signal Tdis according to the control voltage DRV and the detecting result signal Sdet. The above operation details of a voltage waveform detector may be further understood by referring to embodiments of voltage waveform detector 60 detailed in Taiwan Patent Publication No. TW201404010A1, and are not narrated herein for brevity.

The constant-current controller 1044 includes an integrator 1044_2, a comparator 1044_4, a low-pass filter LPF and a mid-value detector 1044_6. The integrator 1044_2 includes a pull-down current source Idn, a capacitor 1044_C, a first sub-current source IUP_1 and a second sub-current source IUP_2. The pull-down current source Idn may generate a down current IDN according to sampling values of the current detecting voltage Vcs, e.g. the down current IDN may be determined according to a detecting voltage mid-value Vcs_m. The capacitor 1044_C is configured to store an integration result voltage Vcco stored in the down current IDN during the period of discharging time. The first sub-current source IUP_1 and the second sub-current source IUP_2 may be selectively arranged in parallel or individually as a pull-up current source I for providing current to the integrator 1044_2. For example, in the embodiment of FIG. 2, the individual first sub-current source IUP_1 may be the pull-up current source I, or the pull-up current source I may be composed of the first sub-current source IUP_1 and the second sub-current source IUP_2 in parallel. The integrator 1044_2 is configured to generate the integration result voltage Vcco according to the discharging period signal Tdis, the current detecting voltage Vcs, the down current IDN and the pull-up current source I. In addition, the mid-value detector 1044_6 is configured to read the current detecting voltage Vcs to obtain the detecting voltage mid-value Vcs_m at a middle timing of a conducting period of the primary side switch element Qnp.

Figure 3A:
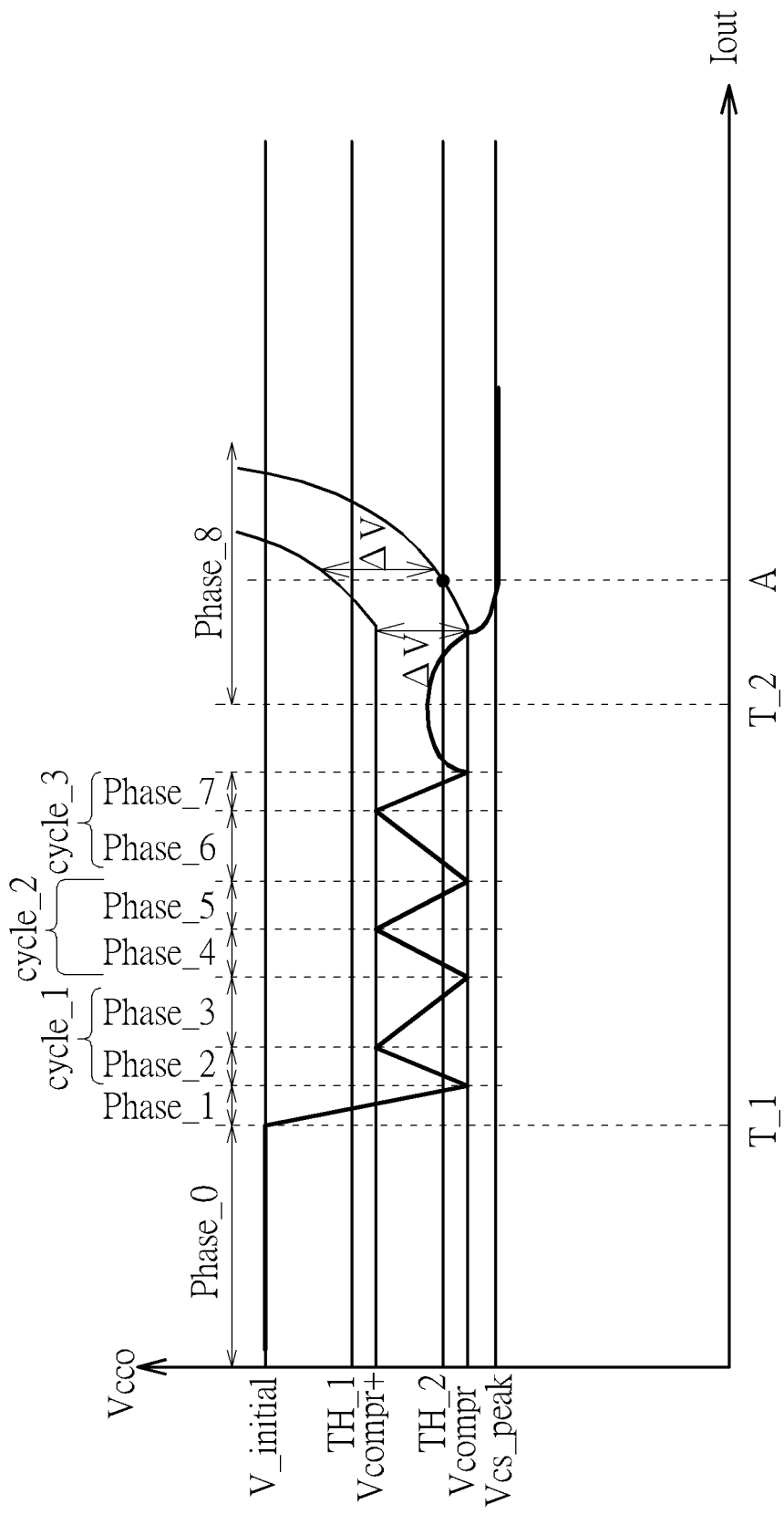
FIG. 3A is a schematic diagram of a relationship between an integration result voltage and a secondary winding output current value according to an embodiment of the present invention.

The comparator 1044_4 includes a first input terminal and a second input terminal. The first input terminal is configured to receive the integration result voltage Vcco and the second input terminal is configured to selectively receive one of a range upper bound voltage Vcompr+ or a range lower bound voltage Vcompr of the constant-current controller 1044. In an embodiment, the range lower bound voltage Vcompr may be ¼ of the second feedback signal Vcomp, the range upper bound voltage Vcompr+ may be the range lower bound voltage Vcompr added with a fixed voltage ΔV, e.g. 0.2V. As shown in FIG. 3A, when the secondary winding output current value Iout, which represents an output power of the power supply 10, is over 240% of an overpower protection setting value, the second feedback signal Vcomp goes up, which increases the first boundary voltage Vcompr+ and the second boundary voltage Vcompr.

Figure 3B:
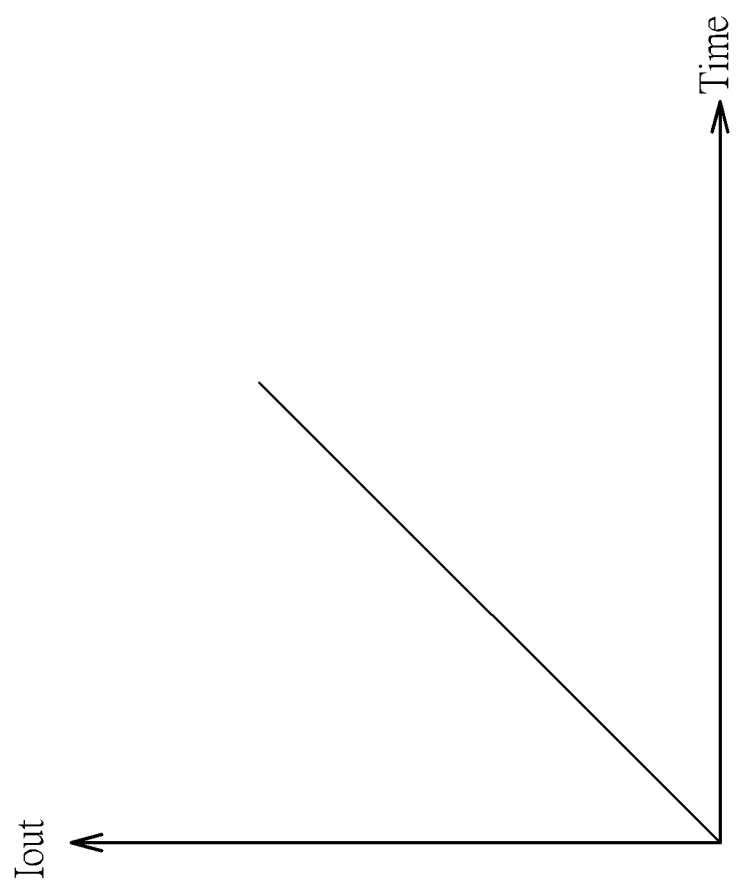
FIG. 3B is a schematic diagram of the secondary winding output current value versus time according to an embodiment of the present invention.

Refer to FIGS. 3A and 3B, wherein FIG. 3A is a schematic diagram of a relationship between the integration result voltage Vcco and the secondary winding output current value Iout according to an embodiment of the present invention, FIG. 3B is a schematic diagram of the secondary winding output current value Iout versus time according to an embodiment of the present invention, which shows that the secondary winding output current value Iout linearly increases with time. FIG. 3A depicts a two-stage constant-current protection measurement being performed under a condition of the integration result voltage Vcco corresponding to different secondary winding output current values Iout. In the embodiment of FIG. 3A, an initial voltage V_initial of the integration result voltage Vcco, a first threshold value T_1 and a second threshold value T_2 of the constant-current control device 104 are defined, wherein the second threshold value T_2 is larger than the first threshold value T_1, and the first threshold value T_1 is related to an overcurrent state of the power supply 10, i.e. when the secondary winding output current value Iout is larger than the first threshold value T_1, the power supply 10 is in the overcurrent state; the second threshold value T_2 is related to an overpower state of the power supply 10, i.e. when the secondary winding output current value Iout is larger than the second threshold value T_2, the power supply 10 is in the overpower state.

In an embodiment, the overcurrent state and the overpower state of the power supply 10 may respectively correspond to 120% of the overcurrent protection setting value and 240% of the overpower protection setting value of the secondary winding output current value Iout. For example, assuming that a standard constant-current value of a product of the secondary winding output current value Iout of the constant-current control device 104 is 3 ampere(A), 120% of the overcurrent protection setting value and 240% of the overpower protection setting value are respectively 3.6 A and 7.2 A.

In the embodiment of the present invention, the first current source is configured to provide a boosting current to charge the capacitor 1044_C by the first sub-current source IUP_1 without conducting the second sub-current source IUP_2; and the second current source is configured to provide the boosting current to charge the capacitor 1044_C via the first sub-current source IUP_1 and the second sub-current source IUP_2 in parallel.

In order to clearly illustrate the relation between the integration result voltage Vcco and the secondary winding output current value Iout, different intervals are labeled in FIG. 3A.

As shown in FIG. 3A, an interval Phase_0 corresponds to the interval of the integrator 1044_2 receiving the first current source (i.e. only the first sub-current source IUP_1) as the pull-up current source I before the overcurrent state (i.e. the secondary winding output current value Iout is smaller than the first threshold value T_1). The detecting voltage mid-value Vcs_m of the interval Phase_0 is smaller and the corresponding down current IDN is smaller. In this interval, when the secondary winding output current value Iout is increased with time as shown in FIG. 3B, the integration result voltage Vcco is maintained at the initial voltage V_initial.

In more detail, when the first current source (i.e. only the first sub-current source IUP_1) is the pull-up current source I, an integration trend of the boosting current provided by the first current source is to increase the integration result voltage Vcco; In contrast, the integration trend of the down current IDN provided by the pull-down current source Idn of the integrator 1044_2 is to decrease the integration result voltage Vcco. In addition, the down current IDN is positively related to the output power of the power supply 10. In the interval Phase_0, when the output power is lower than 120% of the overcurrent protection setting value of the power supply 10, the boosting current provided by the first current source is enough to stop the integration result voltage Vcco from decreasing. A junction of the interval Phase_0 and the interval Phase_1 may happen as follows: when the first current source is the pull-up current source I of the integrator 1044_2 and the integration result voltage Vcco starts to decrease, the output power of the power supply 10 reaches 120% of the overcurrent protection setting value.

As shown in FIG. 3A, the intervals Phase_1-7 illustrate a waveform diagram of a double steady state of the overcurrent state (i.e. the secondary winding output current value Iout is larger than the first threshold value T_1 and the secondary winding output current value Iout is smaller than the second threshold value T_2). In the odd intervals Phase_1, Phase_3, Phase_5, Phase_7 . . . , the integrator 1044_2 is configured to receive the first current source (i.e. only the first sub-current source IUP_1) as the pull-up current source I; in the even intervals Phase_2, Phase_4, Phase_6 . . . , the integrator 1044_2 is switched to receive the second current source (i.e. the first sub-current source IUP_1 and the second sub-current source IUP_2 are connected in parallel) as the pull-up current source I. The waveform of intervals Phase_1-7 of the double steady state explains that the integration result voltage Vcco is varied in response to the variation of the pull-up current source I and is limited between the first boundary voltage Vcompr+ and the second boundary voltage Vcompr, wherein the integration result voltage Vcco may go up and down between the first boundary voltage Vcompr+ and the second boundary voltage Vcompr multiple times. Notably, the relation between the integration result voltage Vcco and the secondary winding output current value Iout of the intervals Phase_1-7 of the double steady state is not limited to one-to-one correspondence, or a quantity of intervals of the double steady state is not limited to seven intervals.

Figure 3C:
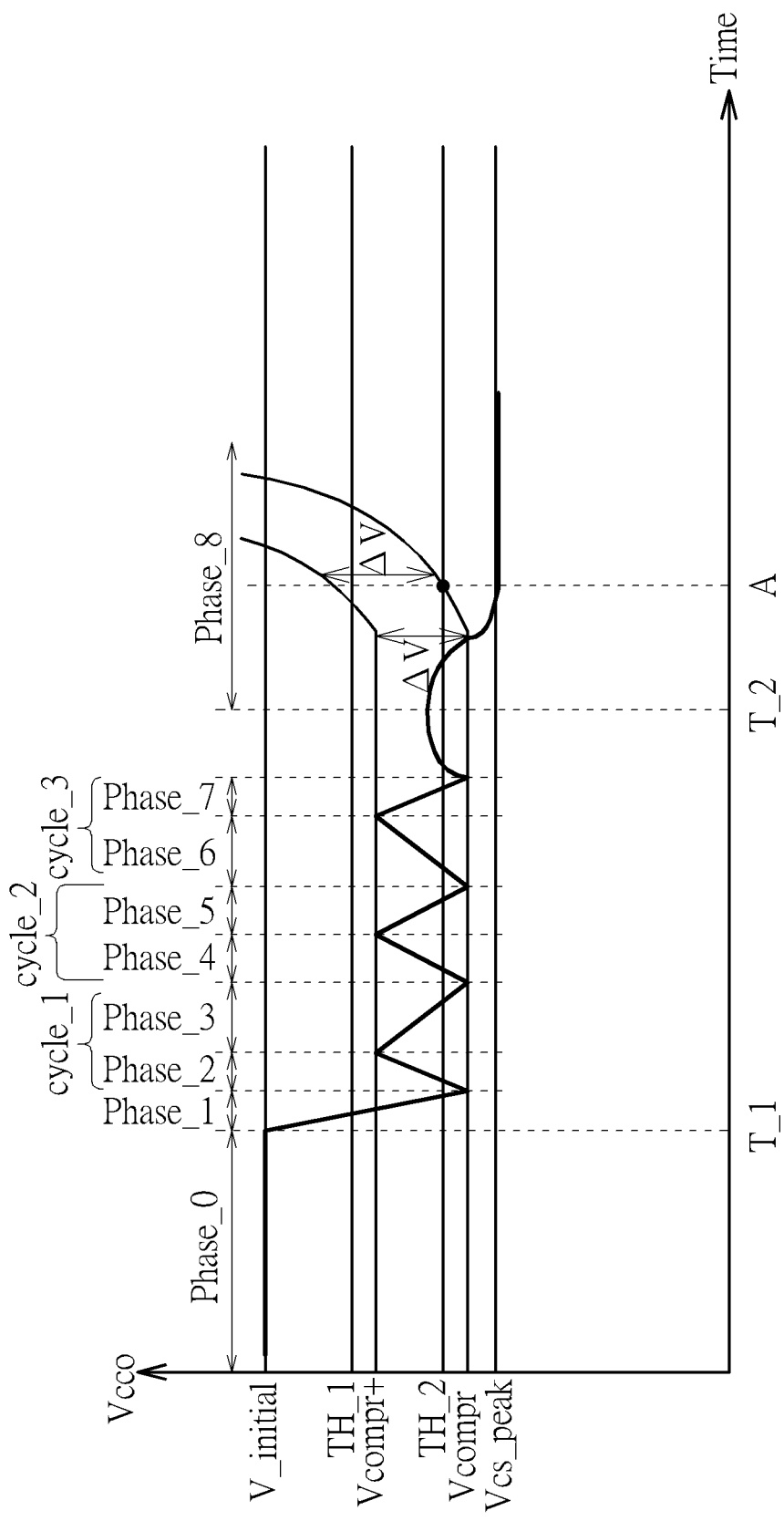
FIG. 3C is a schematic diagram of a relationship between an integration result voltage, a detecting voltage peak value and an overpower risk pulse according to an embodiment of the present invention.
Figure 3D:
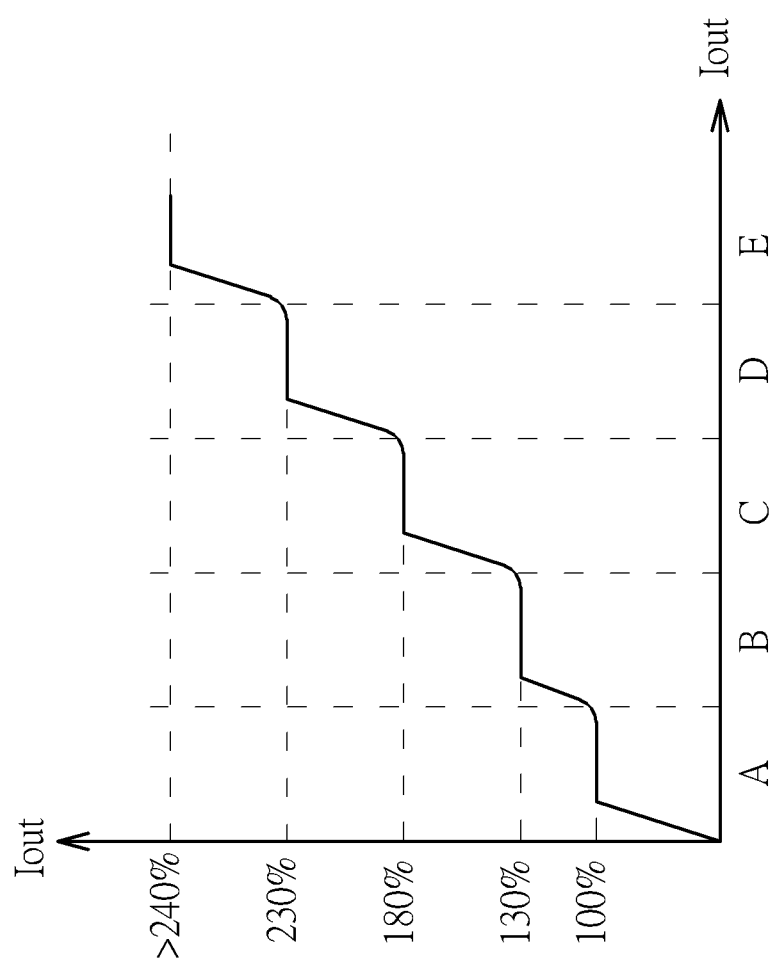
FIG. 3D is a schematic diagram of the secondary winding output current value versus time according to an embodiment of the present invention.
Figure 3E:
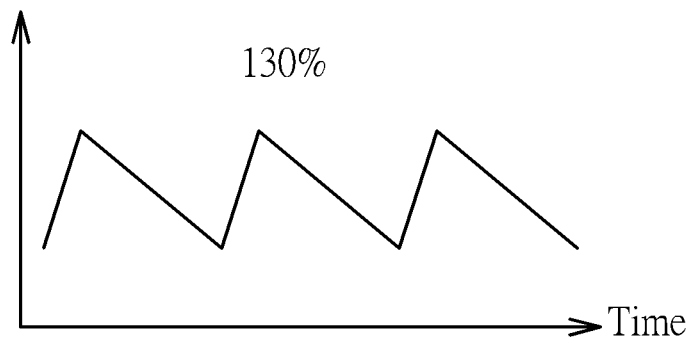
FIG. 3E is a schematic diagram of an absolute value of a slope variation of the integration result voltage between two boundary voltages with different secondary winding output current values according to an embodiment of the present invention.
Figure 3E:
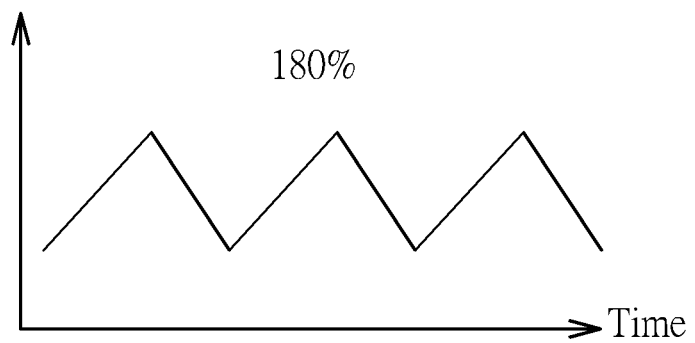
Figure 3E:
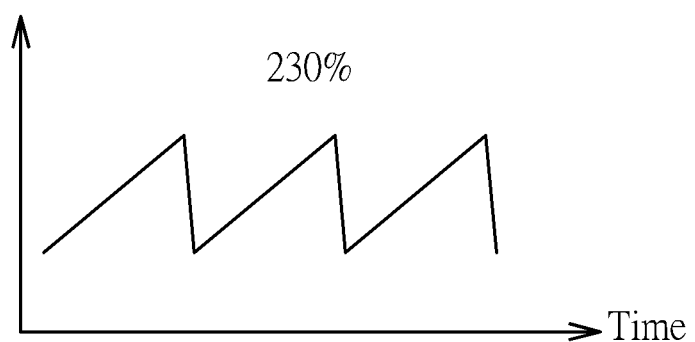

As shown in FIG. 3D, assume that the secondary winding output current value Iout is gradually increased from stages A-E. For example, the stages A-E respectively correspond to 100%, 130%, 180%, 230% and 245% of the standard constant-current value of the power supply 10. The secondary winding output current value Iout is steadily output for a period of time in each stage, and the power supply 10 enters the following stage. In such situation, waveforms corresponding to the integration result voltage Vcco are as follows: (1) in stage A, the waveform corresponds to 100% of the standard constant-current value as shown in Phase_0 of FIG. 3A, the integration result voltage Vcco is maintained at the constant initial voltage V_initial; (2) in stage E, the waveform corresponds to 245% of the standard constant-current value as shown in Phase_8 of FIG. 3A, the integration result voltage Vcco is not able to be maintained at the constant value and is decreased gradually; (3) the waveforms corresponding to 130%, 180%, 230% of the standard constant-current value are as shown in FIG. 3E, wherein the integration result voltage Vcco may be triangle waveforms with different rising-falling slopes. When the secondary winding output current values Iout are 130%, 180% and 230% of the standard constant-current values of the power supply 10, the corresponding down currents IDN are a first down current, a second down current and a third down current. The first down current is smaller than the second down current, and the second down current is smaller than the third down current. As shown in FIG. 3E, corresponding to different secondary winding output current values Iout, a variation relation of absolute values of the rising-falling slopes of the waveforms is shown, and the integration result voltage Vcco is limited between the first boundary voltage Vcompr+ and the second boundary voltage Vcompr. When the secondary winding output current value Iout increases, the down current is increased, an ascent rate of the integration result voltage Vcco is smaller and an absolute value of a slope of the ascent rate of the integration result voltage Vcco is smaller (i.e. the waveform of the ascent rate is more horizontal); when a descent rate of the integration result voltage Vcco increases, a slope of the descent rate of the integration result voltage Vcco is larger (i.e. the waveform of the descent rate is more vertical).

Refer to FIG. 3B which illustrates the intervals Phase_1-7 in FIG. 3A. As shown in FIG. 3B, the secondary winding output current value Iout is linearly and gradually increased with time, e.g. the corresponding 100% of the standard constant-current value of the power supply 10 is linearly and gradually increased to 245% of the standard constant-current value of the power supply 10. As such, the waveforms shown in FIG. 3C may be obtained by transforming the horizontal axis (i.e. the secondary winding output current value Iout) of FIG. 3A into a time axis.

In the interval Phase_1, the integrator 1044_2 is configured to receive the first current source as the pull-up current source I, and in the interval of the overcurrent state (i.e. the secondary winding output current value Iout is larger than the first threshold value T_1), a variation trend of the integration result voltage Vcco (i.e. decreased with time) is different from the integration trend of the first current source (i.e. the integration result voltage Vcco is increased), which triggers an over-current protection of the power supply 10. As shown in the embodiment of the constant-current control device 104 in FIG. 2, the constant-current control device 104 may include a first protection mechanism comparative circuit PC_1, which includes a comparator for comparing the integration result voltage Vcco and a first protection mechanism voltage threshold TH_1. When the integration result voltage Vcco is lower than the first protection mechanism voltage threshold TH_1, a timer Timer_1 is triggered, and when a first predetermined time period is exceeded, the power supply 10 is configured to stop providing an output current.

A boundary between the interval Phase_1 and the interval Phase_2 may happen as follows: when the integration result voltage Vcco is decreased to the second boundary voltage Vcompr, the integration result voltage Vcco is lowered to a range lower bound voltage (i.e. the second boundary voltage Vcompr), and the comparator 1044_4 is triggered to change an output, such that the second sub-current source IUP_2 of the integrator 1044_2 is conductive and is connected in parallel with the first sub-current source IUP_1. In this condition, the first sub-current source IUP_1 and the second sub-current source IUP_2 charge the capacitor 1044_C, and the second input terminal of the comparator 1044_4 is switched to receive the first boundary voltage Vcompr+ (i.e. an upper limit voltage value of the interval).

As shown in the interval Phase_2 of FIG. 3C, the pull-up current source I received by the integrator 1044_2 is the second current source, and the power supply 10 is not yet in the interval of the overpower state (i.e. the secondary winding output current value Iout is smaller than the second threshold value T_2). In the interval Phase_2, the second current source is a second pull-up current source of the integrator 1044_2, and the integration trend of the second current source is to increase the integration result voltage Vcco; when the output power of the power supply 10 has not reached 240% of the overpower protection setting value, the boosting current provided by the second current source is enough to maintain the integration result voltage Vcco. Therefore, when the pull-up current source I received by the integrator 1044_2 is the second current source, the variation trend of the integration result voltage Vcco is same as the integration trend of the second current source (i.e. increased with time).

A boundary between the interval Phase_2 and the interval Phase_3 may happen as follows: when the pull-up current source I received by the integrator 1044_2 is the second current source, and the integration result voltage Vcco reaches the first boundary voltage Vcompr+, i.e. the integration result voltage Vcco is increased to a range upper bound voltage, the comparator 1044_4 is triggered to change the output and cut off the second sub-current source IUP_2. As such, the second sub-current source IUP_2 stops charging the capacitor 1044_C and the second input terminal is switched to receive the second boundary voltage Vcompr (i.e. the range lower bound voltage) and the power supply 10 enters the interval Phase_3.

In the interval Phase_3, the pull-up current source I received by the integrator 1044_2 is the first current source (i.e. the first sub-current source IUP_1 individually charges the capacitor 1044_C). Meanwhile, the second input terminal of the comparator 1044_4 is switched to receive the second boundary voltage Vcompr (i.e. the range lower bound voltage). In the interval Phase_3, when the pull-up current source I received by the integrator 1044_2 is the pull-up current source I, the variation trend of the integration result voltage Vcco (i.e. the integration result voltage Vcco is decreased with time) is different from the integration trend of the first current source (i.e. the first current source is configured to increase the integration result voltage Vcco).

A boundary between the interval Phase_3 and the interval Phase_4 may happen as follows: when the pull-up current source I received by the integrator 1044_2 is the first current source, and when the integration result voltage Vcco is decreased to the second boundary voltage Vcompr, the comparator 1044_4 is triggered to change the output, which is similar to the operation of the boundary between the interval Phase_1 and the interval Phase_2, and the power supply 10 enters the interval Phase_4.

In the interval Phase_4, the pull-up current source I received by the integrator 1044_2 is the second current source (i.e. the first sub-current source IUP_1 and the second sub-current source IUP_2 charges the capacitor 1044_C). Meanwhile, the second input terminal of the comparator 1044_4 is switched to receive the first boundary voltage Vcompr+ (i.e. the range upper bound voltage). In the interval Phase_4, when the pull-up current source I received by the integrator 1044_2 is the second current source, the variation trend of the integration result voltage Vcco (i.e. increased with time) is same as the integration trend of the second current source (i.e. the second current source is increased). Operations of the interval Phase_4 and the interval Phase_6 are similar to that of the interval Phase_2, and operations of the interval Phase_7 are similar to that of the interval Phase_3 and the interval Phase_5; they are not narrated herein for brevity.

According to embodiments of the present invention, mechanisms may be concluded as follows: (a) according to the interval Phase_3, the interval Phase_5 and the interval Phase_7 shown in FIG. 3C, when the secondary winding output current value Iout is larger than the first threshold value T_1, and the pull-up current source I received by the integrator 1044_2 is the first current source, the variation trend of the integration result voltage Vcco (i.e. the integration result voltage Vcco is decreased with time) is different from the integration trend of the first current source (i.e. the first current source is increased), and gradually decreased. (b) according to the interval Phase_2, the interval Phase_4 and the interval Phase_6 shown in FIG. 3C, when the secondary winding output current value Iout is smaller than second threshold value T_2 and the pull-up current source I received by the integrator 1044_2 is the second current source, the variation trend of the integration result voltage Vcco (i.e. the integration result voltage Vcco is increased with time) is same as the integration trend of the second current source (i.e. the second current source is increased), and gradually increased. (c) according to the interval Phase_2 to the interval Phase_7 shown in FIG. 3C, when the integration result voltage Vcco is decreased to the second boundary voltage Vcompr, or increased to the first boundary voltage Vcompr+, the comparator 1044_4 is triggered to change the output to determine whether the second sub-current source IUP_2 is a part of the pull-up current source or not. Based on the above mechanisms (a)-(c), when the secondary winding output current value Iout is larger than the first threshold value T_1 and the secondary winding output current value Iout is smaller than the second threshold value T_2, the integration result voltage Vcco is maintained between the first boundary voltage Vcompr+ and the second boundary voltage Vcompr. Therefore, the integration result voltage Vcco is far below a voltage range of the initial voltage V_initial, such that the power supply 10 may be turned off rapidly when the output power of the power supply 10 reaches 240% of the overpower protection setting value.

According to the interval Phase_8 of FIG. 3C, when the pull-up current source I received by the integrator 1044_2 is changed to the second current source (i.e. the first sub-current source IUP_1 and the second sub-current source IUP_2 charge the capacitor 1044_C), the variation trend of the integration result voltage Vcco (i.e. the integration result voltage Vcco is decreases with time) is different from the integration trend of the second current source (i.e. the second current source is increased), the output power of the power supply 10 exceeds 240% of the overpower protection setting value, and thereby the constant-current controller 1044 is configured to trigger an operation of an overpower overload protection circuit of the power supply 10. As such, when the secondary winding output current value Iout is larger than the second threshold value T_2, even though the pull-up current source I received by the integrator 1044_2 is increased to the second current source (i.e. the first sub-current source IUP_1 and the second sub-current source IUP_2 are connected in parallel for charging), the variation trend of the integration result voltage Vcco (i.e. the integration result voltage Vcco is decreased with time) is different from the integration trend of the second current source (i.e. the second current source is increased), and gradually decreased.

According to an embodiment of the constant-current control device 104 shown in FIG. 2, in order to perform an overpower protection measurement of the power supply 10, the constant-current control device 104 may include a second protection mechanism comparative circuit PC_2. The second protection mechanism comparative circuit PC_2 includes a comparator P_2, which is configured to compare the second boundary voltage Vcompr and a second protection mechanism voltage threshold TH_2. As such, when the second boundary voltage Vcompr is larger than the second protection mechanism voltage threshold TH_2 (i.e. a timing point A labeled shown in FIG. 3C, which corresponds to an intersection of the second boundary voltage Vcompr and the second protection mechanism voltage threshold TH_2), a timer Timer_2 is triggered, and the power supply 10 stops providing the output current when a second predetermined time period is exceeded.

Figure 3F:
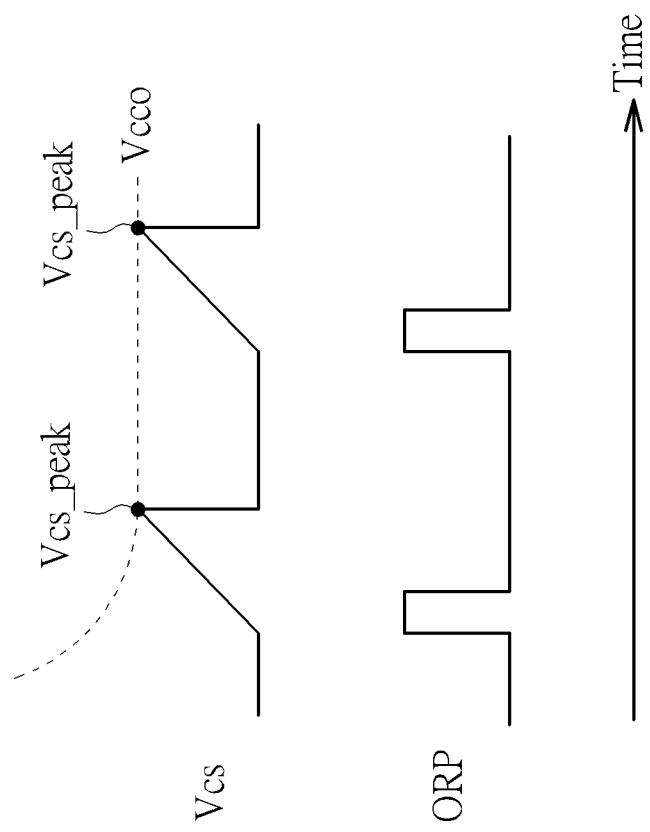
FIG. 3F is a schematic diagram of a relationship between the integration result voltage, the detecting voltage peak and the overpower risk pulse according to an embodiment of the present invention.

According to waveforms of the integration result voltage Vcco and a detecting voltage peak value Vcs_peak shown in FIG. 3F, a third protection mechanism comparative circuit (not shown in the figure) may be applied thereon, wherein the third protection mechanism comparative circuit is configured to compare the integration result voltage Vcco and corresponding detecting voltage peak value Vcs_peak when conducting the primary side switch element Qnp in each cycle. In this embodiment, a comparator (not shown in the figure) is configured to repeatedly output an overpower risk pulse ORP in each cycle, such that when the integration result voltage Vcco is decreased to the detecting voltage peak value Vcs_peak (i.e. an intersection of the integration result voltage Vcco and the detecting voltage peak value Vcs_peak shown in FIG. 3F), the constant-current control device 104 may trigger the timer Timer_2 according to the overpower risk pulse ORP, and the power supply 10 stops providing the output current when the second predetermined time period is exceeded.

The first protection mechanism comparative circuit PC_1 is configured to determine whether 120% of the overcurrent protection setting value of the power supply 10 is exceeded, and the second protection mechanism comparative circuit PC_2 is configured to determine whether 240% of the overpower protection setting value of the overcurrent protection setting value of the power supply 10 is exceeded. Therefore, when the timer Timer_2 is triggered by the second protection mechanism comparative circuit PC_2, 240% of the overpower protection setting value of the power supply 10 is met, and the second predetermined time period is shorter than the first predetermined time period to avoid overloading of the power supply 10. For example, the first predetermined time period may be 100 ms and the second predetermined time period may be 30 ms, i.e. when the first protection mechanism comparative circuit PC_1 determines that 120% of the overcurrent protection setting value of the power supply 10 is exceeded for over 100 ms, the power supply 10 is turned off, and when the second protection mechanism comparative circuit PC_2 determines that 240% of the overpower protection setting value of the power supply 10 is exceeded for over 30 ms, the power supply 10 is turned off. Time lengths of the first predetermined time period and the second predetermined time period are not limited to the above examples.

Figure 4:
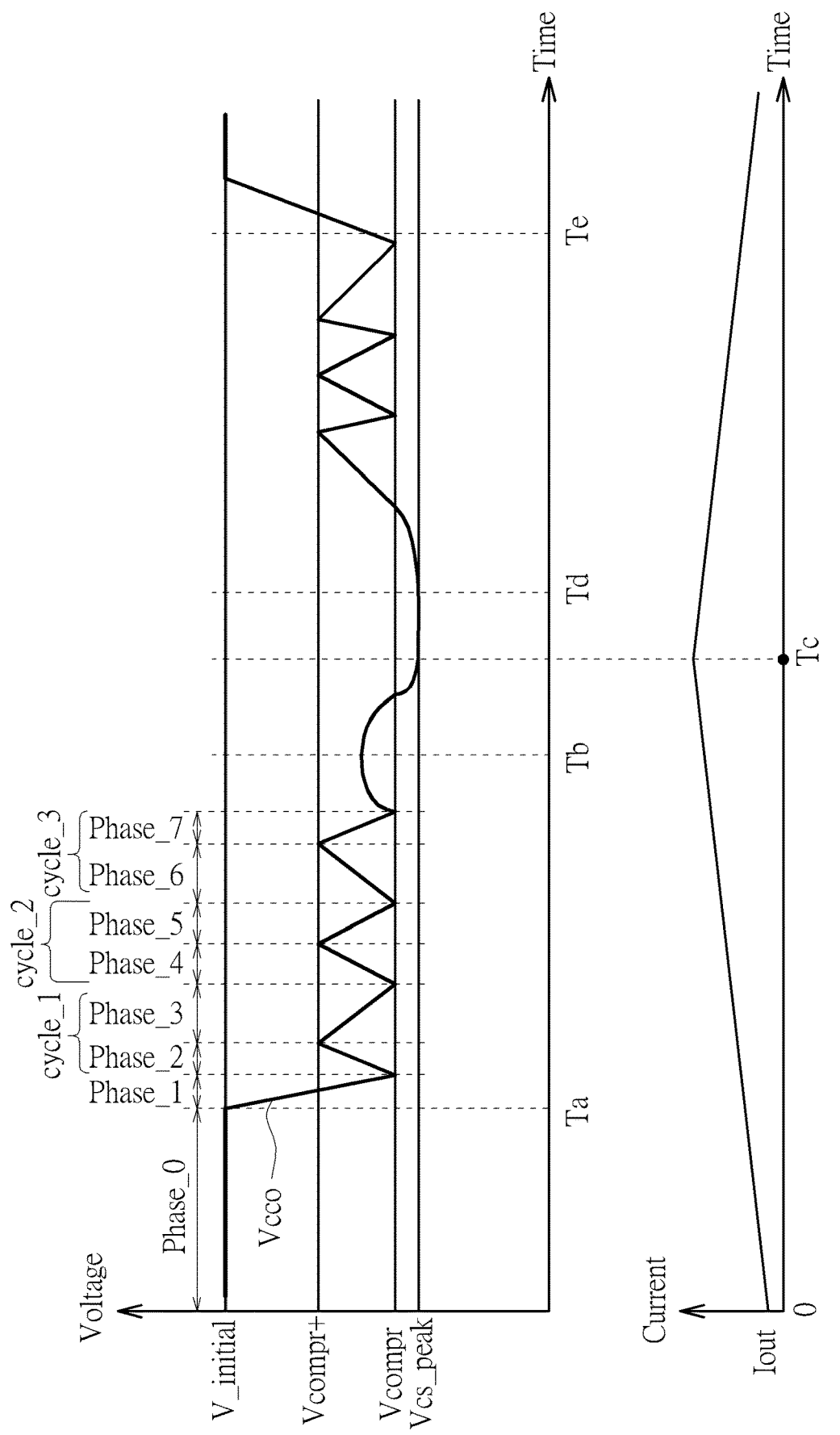
FIG. 4 is a schematic diagram of the integration result voltage and the secondary winding output current value respectively versus time according to an embodiment of the present invention.

FIG. 4 is a schematic diagram of a relation of the integration result voltage Vcco and the secondary winding output current value Iout versus time according to an embodiment of the present invention. Compared with FIG. 3C, the secondary winding output current value Iout in FIG. 4 starts from a timing point 0, increases linearly and reaches a maximum value at a timing point TC. At the timing point 0, the secondary winding output current value Iout has a lowest value and the integration result voltage Vcco is the initial voltage V_initial. At a timing point Ta, the first current source (i.e. the first sub-current source IUP_1) is the pull-up current source and the integration result voltage Vcco decreases, which represents that the power supply is in the overcurrent state. At a timing point Tb, the second current source (i.e. the first sub-current source IUP_1 and the second sub-current source IUP_2 are connected in parallel) is the pull-up current source and the integration result voltage Vcco decreases, which represents that the power supply is in the overpower state. At the timing point Tc, the integration result voltage Vcco is decreased to the detecting voltage peak value Vcs_peak (or the second boundary voltage Vcompr is increased over the second protection mechanism voltage threshold TH_2), such that the timer Timer_2 is triggered by the second protection mechanism comparative circuit PC_2. Meanwhile, the secondary winding output current value Iout starts to decrease after reaching the maximum value. A time difference between the timing point Tc and a timing point Td is less than 30 ms. At the timing point Td, the secondary winding output current value Iout keeps decreasing to eliminate the overpower state, such that the power supply 10 is not turned off with 240% of the overpower protection mechanism of the power supply 10. At a timing point Te, the secondary winding output current value Iout keeps decreasing to eliminate the overcurrent state, and the integration result voltage Vcco goes back to the initial voltage V_initial.

Figure 5:
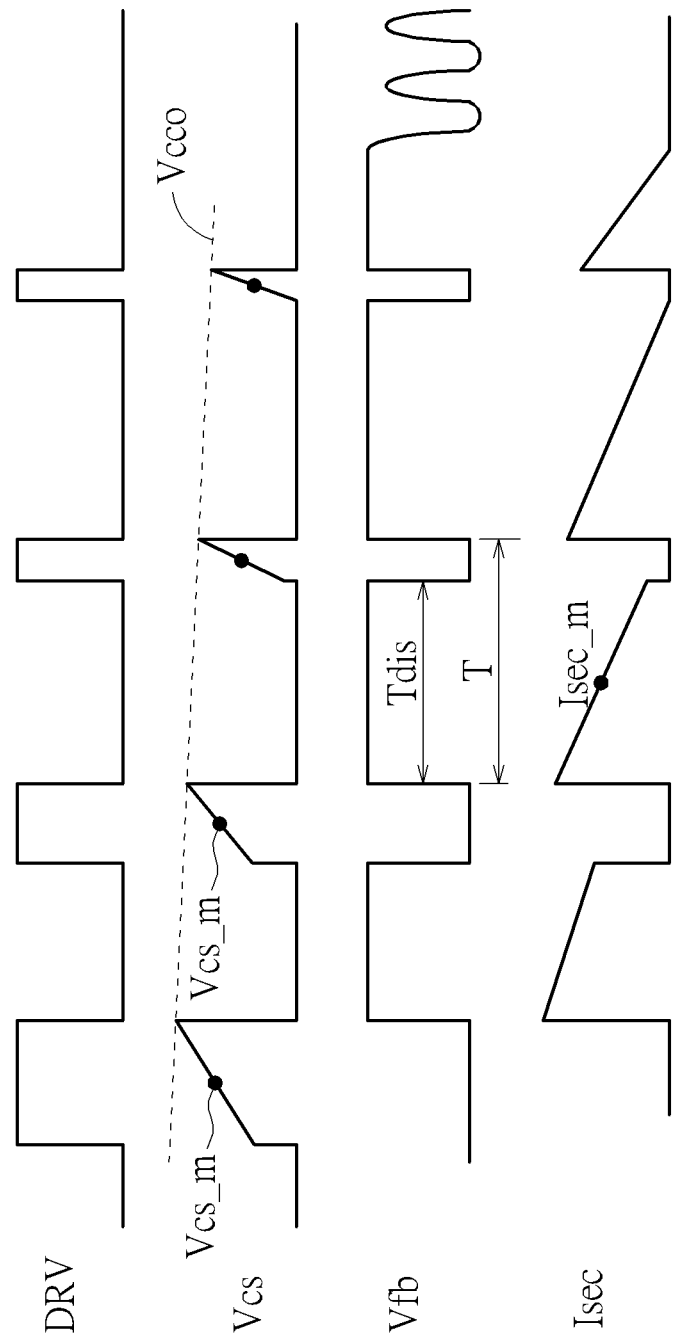
FIG. 5 is a waveform schematic diagram of a control voltage, a current detecting voltage, the integration result voltage, a first feedback voltage and a secondary winding current value according to an embodiment of the present invention.

FIG. 5 is a waveform schematic diagram of the control voltage DRV of the constant-current control device 104, the current detecting voltage Vcs, the integration result voltage Vcco, the first feedback voltage Vfb and the secondary winding current value Isec of the secondary winding NS according to an embodiment of the present invention. According to the embodiment of FIG. 5, the integration result voltage Vcco is varied with the current detecting voltage Vcs, and the secondary winding output current value Iout is determined by a formula (1):

$$Iout = \frac{Tdis}{T} \cdot Isec_m = \frac{Tdis}{T} \cdot \frac{np}{ns} \cdot Iin = \frac{Tdis}{T} \cdot \frac{np}{ns} \cdot \frac{Vcs\_m}{Rcs} \quad (1)$$

T denotes the cycle of each control voltage DRV, Isec_m denotes a secondary winding current mid-value of the secondary winding current value Isec in each cycle, np denotes a number of coils of the primary winding, and ns denotes a number of coils of the secondary winding.

As shown in FIG. 5, preferably, the pull-down current source Idn of the integrator 1044_2 is generated according to the detecting voltage mid-value Vcs_m, and a switch of the pull-down current source Idn is conductive corresponding to the discharging period signal Tdis; formulas (2)-(4) are determined as follows:

$$I = \frac{Tdis}{T} \cdot IDN \quad (2)$$

$$\frac{Vset}{Rup} = \frac{Tdis}{T} \cdot \frac{Vcs\_m}{Rdn} \quad (3)$$

$$Vset \cdot \frac{Rdn}{Rup} = \frac{Tdis}{T} \cdot Vcs\_m \quad (4)$$

Vset denotes an equivalent voltage of the pull-up current source I, Rup denotes an equivalent resistor of the pull-up current source I, and Rdn denotes an equivalent resistor of the pull-down current source Idn.

Therefore, the secondary winding output current value Iout of the constant-current control device 104 according to an embodiment of the present invention may be determined by formulas (1), (4) and a formula (5) is determined as follows:

$$Iout = \frac{1}{Rcs} \cdot \frac{np}{ns} \cdot Vset \cdot \frac{Rdn}{Rup} \quad (5)$$

Figure 6:
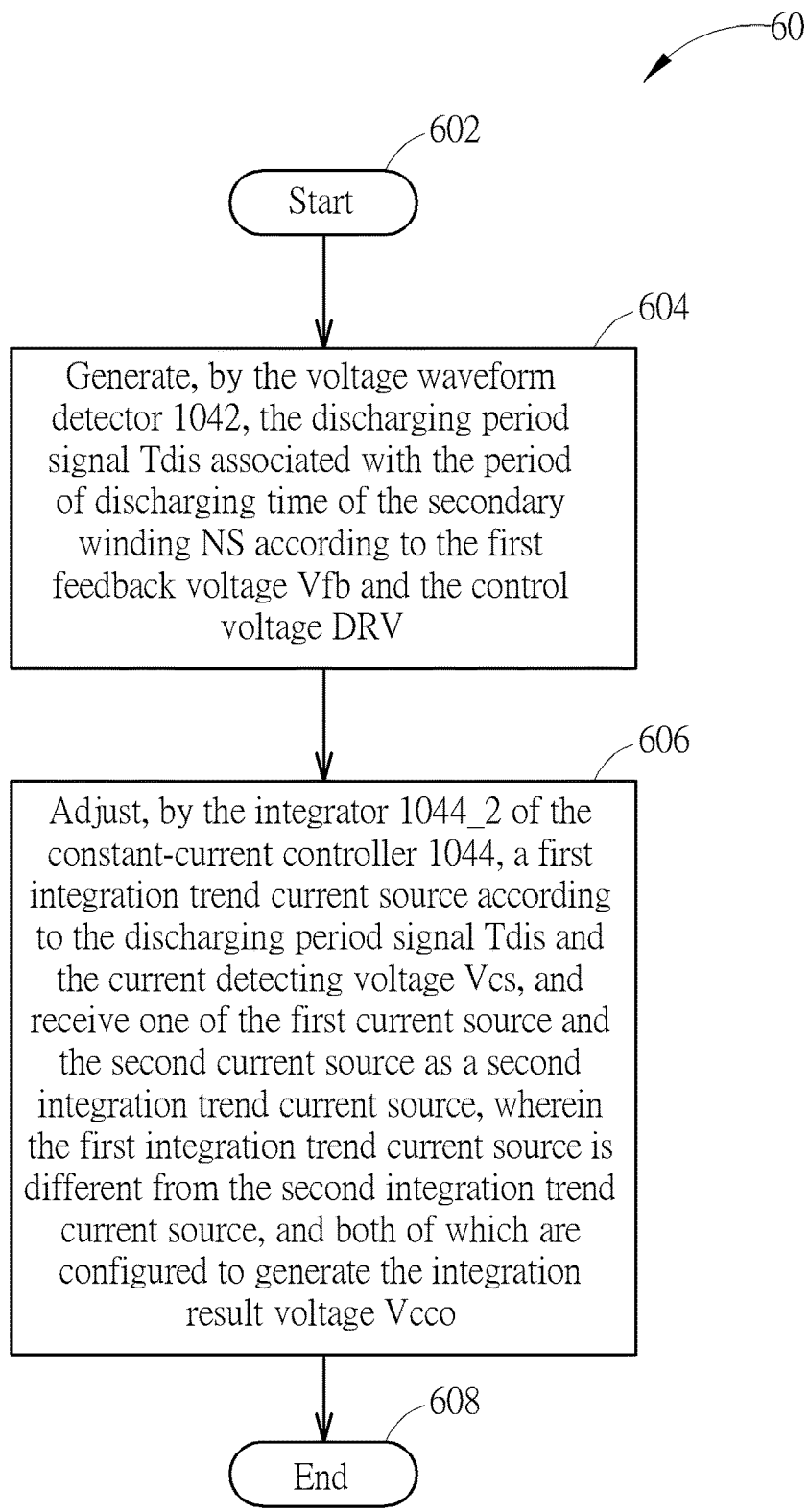
FIG. 6 is a schematic diagram of a constant-current control method according to an embodiment of the present invention.

An operation of the constant-current control device 104 may be illustrated by a constant-current control method 60, as shown in FIG. 6. The constant-current control method 60 includes the following steps:

Step 602: Start.

Step 604: Generate, by the voltage waveform detector 1042, the discharging period signal Tdis associated with the period of discharging time of the secondary winding NS according to the first feedback voltage Vfb and the control voltage DRV.

Step 606: Adjust, by the integrator 1044_2 of the constant-current controller 1044, a first integration trend current source according to the discharging period signal Tdis and the current detecting voltage Vcs, and receive one of the first current source and the second current source as a second integration trend current source, wherein the first integration trend current source is different from the second integration trend current source, and both of which are configured to generate the integration result voltage Vcco.

Step 608: End.

Refer to FIG. 2 for an explanation of step 606: (1) a current size of the pull-down current source Idn and a conducting period length are respectively adjusted by the discharging period signal Tdis and the current detecting voltage Vcs, which is utilized for pulling down the integration result voltage Vcco; (2) one of the first current source and the second current source is selectively received as the pull-up current source, which is utilized for pulling up the integration result voltage Vcco. Notably, the present invention is not limited thereto, e.g. the discharging period signal Tdis and the current detecting voltage Vcs may adjust a pull-up current source and selectively receive one of the first current source and the second current source as the pull-down current source Idn and vice versa. Additional circuitry required for modifications of the integration trend also belong to the scope of the present invention.

The current detecting voltage Vcs is associated with the secondary winding current value Isec flowing through the secondary winding NS, and the secondary winding current value Isec is associated with the secondary winding output current value Iout. The pull-down current source Idn is preferably generated according to the detecting voltage mid-value Vcs_m, such that the integrator 1044_2 may precisely determine the secondary winding output current value Iout without detecting the time length of the discharging period signal Tdis.

Embodiments of the constant-current control device 104 as detailed in the above can be referred to for further understanding of operations of the constant-current control method 60, and are not narrated herein for brevity.

In summary, the present invention provides a constant-current control device and a related constant-current control method, which executes a two-stage constant-current control including an overcurrent protection mechanism and an overpower protection mechanism before the overcurrent protection mechanism of a power supply is performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A constant-current control device for a power supply, wherein the power supply includes a primary side switch and a secondary winding, the primary side switch is configured to receive a control voltage to be selectively conductive or open, the constant-current control device comprising:
    a voltage waveform detector, configured to generate a discharging period signal based on a first feedback voltage and the control voltage, and the discharging period signal associated with a period of discharging time of the secondary winding; and
    a constant-current controller, coupled to the voltage waveform detector, including an integrator, a first current source and a second current source, wherein the integrator is configured to receive one of the first current source and the second current source to generate an integrator result voltage based on the discharging period signal and a current detecting voltage, the current detecting voltage is related to a secondary winding current value flowing through the secondary winding, and the secondary winding current value is positively related to a secondary winding output current value of the power supply;
    wherein when the integrator is configured to receive the first current source and a variation trend of the integrator result voltage is different from an integration trend of the first current source, and when the integrator result voltage reaches a second boundary voltage, the integrator is switched to receive the second current source;
    wherein when the integrator is switched to receive the second current source and the variation trend of the integrator result voltage is same as an integration trend of the second current source, and when the integrator result voltage reaches a first boundary voltage, the integrator is switched to receive the first current source.

2. The constant-current control device of claim 1, wherein the first current source is selectively acting as a first pull-up current source of the integrator, and the integration trend of the first current source is to increase the integrator result voltage; wherein the integrator includes a pull-down current source configured to generate a down current according to the current detecting voltage and the discharging period signal, and an integration trend of the pull-down current source is to decrease the integrator result voltage; wherein when the integrator receives the first current source, the variation trend of the integrator result voltage is different from the integration trend of the first current source, and when the integrator result voltage reaches the second boundary voltage, the integrator result voltage is reduced to a range lower bound voltage.

3. The constant-current control device of claim 1, wherein the second current source is selectively acting as a second pull-up current source of the integrator, and the integration trend of the second current source is to increase the integrator result voltage; wherein the integrator includes a pull-down current source configured to generate a down current according to the current detecting voltage and the discharging period signal, and the integration trend of the pull-down current source is to reduce the integrator result voltage; wherein when the integrator receives the second current source and the variation trend of the integrator result voltage is same as the integration trend of the second current source, and the integrator result voltage reaches the first boundary voltage, the integrator result voltage is increased to a range upper bound voltage.

4. The constant-current control device of claim 1, wherein when the integrator receives the first current source and the variation trend of the integrator result voltage is different from the integration trend of the first current source, the secondary winding output current value is higher than a first threshold value; when the integrator receives the second current source and the variation trend of the integrator result voltage is different from the integration trend of the second current source, the secondary winding output current value is higher than a second threshold value; wherein the first current source is lower than the second current source, and the first threshold value is lower than the second threshold value; and when the secondary winding output current value is higher than the first threshold value and also lower than the second threshold value, the integrator result voltage is maintained between the first boundary voltage and the second boundary voltage.

5. The constant-current control device of claim 1, wherein the integrator comprises:
    a pull-down current source, configured to generate a down current based on the current detecting voltage and the discharging period signal;
    a capacitor, configured to store the integrator result voltage of the down current corresponding to the discharging period signal; and
    a first sub-current source and a second sub-current source;
    wherein the first current source is composed of the first sub-current source, the second current source is composed of the first sub-current source and the second sub-current source connected in parallel.

6. The constant-current control device of claim 5, wherein the integrator further comprises:
    a comparator, including a first input terminal and a second input terminal, the first input terminal is configured to receive the integrator result voltage, and the second input terminal is configured to selectively receive one of the range lower bound voltage and the range lower bound voltage;
    wherein when the integrator result voltage is reduced to the range lower bound voltage, the first sub-current source and the second sub-current source are connected in parallel, such that the first sub-current source and the second sub-current source are configured to charge the capacitor, and the second input terminal is switched to receive the range lower bound voltage;

wherein when the integrator result voltage is increased to the range lower bound voltage, the comparator is configured to cut off the second sub-current source, such that the second sub-current source stops charging the capacitor and the second input terminal is switched to receive the range lower bound voltage.

7. The constant-current control device of claim 1, wherein the constant-current controller further comprises:
   a first protection mechanism comparative circuit, configured to compare the integrator result voltage and a first protection mechanism voltage threshold, and when the integrator result voltage is lower than the first protection mechanism voltage threshold, a timer is triggered; and when a first predetermined time period is exceeded, the power supply is configured to stop providing an output current.

8. The constant-current control device of claim 7, wherein the current detecting voltage corresponds to a detecting voltage peak value of the secondary winding current value, wherein the constant-current controller further comprises:
   a second protection mechanism comparative circuit, configured to reduce a conveyed energy when conducting the primary side switch according to the integrator result voltage and reduce the detecting voltage peak value; when the integrator result voltage is reduced to trigger the second protection mechanism comparative circuit to reduce the detecting voltage peak value, the timer is triggered; and when a second predetermined time period is exceeded, the power supply is configured to stop providing the output current.

9. The constant-current control device of claim 8, wherein the second protection mechanism comparative circuit is configured to compare the integrator result voltage and the detecting voltage peak value, and when the integrator result voltage is reduced to the detecting voltage peak value, the second protection mechanism comparative circuit is triggered.

10. The constant-current control device of claim 5, wherein the current detecting voltage corresponds to a detecting voltage mid-value of the secondary winding current value, wherein the pull-down current source is generated according to the detecting voltage mid-value.

11. A constant-current control method for a power supply, wherein the power supply comprises a voltage waveform detector, a constant-current controller, a primary side switch and a secondary winding, and the primary side switch is configured to receive a control voltage to be selectively conductive or open, the constant-current control device comprising:
   generating a discharging period signal associated with a period of discharging time of the secondary winding according to a first feedback voltage and the control voltage; and
   receiving, by an integrator of the constant-current controller, one of the first current source and the second current source according to the discharging period signal and a current detecting voltage to generate an integrator result voltage, the current detecting voltage is related to a secondary winding current value flowing through the secondary winding, and the secondary winding current value is positively related to a secondary winding output current value of the power supply;
   wherein when the integrator is configured to receive the first current source and a variation trend of the integrator result voltage is different from an integration trend of the first current source, and when the integrator result voltage reaches a second boundary voltage, the integrator is configured to receive the second current source;
   wherein when the integrator is switched to receive the second current source and the variation trend of the integrator result voltage is same as an integration trend of the second current source, and when the integrator result voltage reaches a first boundary voltage, the integrator is configured to receive the first current source.

12. The constant-current control method of claim 11, further comprising:
   the first current source is selectively a first pull-up current source of the integrator, and the integration trend of the first current source is configured to increase the integrator result voltage;
   wherein the integrator includes a pull-down current source configured to generate a down current according to the current detecting voltage and the discharging period signal, and an integration trend of the pull-down current source is configured to decrease the integrator result voltage;
   wherein when the integrator receives the first current source, the variation trend of the integrator result voltage is different from the integration trend of the first current source, and the integrator result voltage reaches the second boundary voltage, the integrator result voltage is reduced to a range lower bound voltage.

13. The constant-current control method of claim 11, further comprising:
   the second current source is selectively a second pull-up current source of the integrator, and the integration trend of the second current source is configured to increase the integrator result voltage;
   wherein the integrator includes a pull-down current source configured to generate a down current according to the current detecting voltage and the discharging period signal, and the integration trend of the pull-down current source is configured to reduce the integrator result voltage;
   wherein when the integrator receives the second current source and the variation trend of the integrator result voltage is same as the integration trend of the second current source, and the integrator result voltage reaches the first boundary voltage, the integrator result voltage is increased to a range upper bound voltage.

14. The constant-current control method of claim 11, wherein when the integrator receives the first current source and the variation trend of the integrator result voltage is different from the integration trend of the first current source, the secondary winding output current value is higher than a first threshold value; when the integrator receives the second current source and the variation trend of the integrator result voltage is different from the integration trend of the second current source, the secondary winding output current value is higher than a second threshold value; wherein when the first current source is lower than the second current source, the first threshold value is lower than the second threshold value; and when the secondary winding output current value is higher than the first threshold value and the secondary winding output current value is lower than the second threshold value, the integrator result voltage is maintained between the first boundary voltage and the second boundary voltage.

15. The constant-current control method of claim 11, further comprising:

generating, by a pull-down current source of the integrator, a down current according to the current detecting voltage and the discharging period signal; and storing, by a capacitor of the integrator, the integrator result voltage of the down current of the discharging period signal;

wherein the first current source is composed of a first sub-current source of the integrator, and the second current source is composed of the first sub-current source and a second sub-current source in parallel.

16. The constant-current control method of claim 15, further comprising:

receiving, by a first input terminal of a comparator of the integrator, the integrator result voltage, and configuring a second input terminal of a comparator to selectively receive one of the range lower bound voltage and the range lower bound voltage;

wherein when the integrator result voltage is reduced to the range lower bound voltage, the first sub-current source and the second sub-current source are connected in parallel, such that the first sub-current source and the second sub-current source are configured to charge the capacitor, and the second input terminal is switched to receive the range lower bound voltage;

wherein when the integrator result voltage is increased to the range lower bound voltage, the comparator is configured to cut off the second sub-current source, such that the second sub-current source does not charge the capacitor and the second input terminal is switched to receive the range lower bound voltage.

17. The constant-current control method of claim 11, further comprising:

comparing, by a first protection mechanism comparative circuit of the constant-current controller, the integrator result voltage and a first protection mechanism voltage threshold, wherein when the integrator result voltage is lower than the first protection mechanism voltage threshold, a timer is triggered; and when a first predetermined time period is exceeded, the power supply is configured to stop providing an output current.

18. The constant-current control method of claim 17, further comprising:

reducing, by a second protection mechanism comparative circuit of the constant-current controller, a conveyed energy when conducting the primary side switch according to the integrator result voltage to reduce the detecting voltage peak value; when the integrator result voltage is reduced to trigger the second protection mechanism comparative circuit to reduce the detecting voltage peak value, the timer is triggered; and when a second predetermined time period is exceeded, the power supply is configured to stop providing the output current.

19. The constant-current control method of claim 18, wherein the second protection mechanism comparative circuit is configured to compare the integrator result voltage and the detecting voltage peak value, and when the integrator result voltage is reduced to the detecting voltage peak value, the second protection mechanism comparative circuit is triggered.

20. The constant-current control method of claim 15, wherein the current detecting voltage corresponds to a detecting voltage mid-value of the secondary winding current value, wherein the pull-down current source is generated according to the detecting voltage mid-value.

* * * * *